(No Model.)

J. H. ANTHONY.
Device for Connecting and Disconnecting the Fly Wheels and Shafts of Sewing Machines.

No. 236,407. Patented Jan. 11, 1881.

WITNESSES.

INVENTOR.

UNITED STATES PATENT OFFICE.

JAMES H. ANTHONY, OF PROVIDENCE, RHODE ISLAND, ASSIGNOR TO THE PROVIDENCE TOOL COMPANY, OF SAME PLACE.

DEVICE FOR CONNECTING AND DISCONNECTING THE FLY-WHEELS AND SHAFTS OF SEWING-MACHINES.

SPECIFICATION forming part of Letters Patent No. 236,407, dated January 11, 1881.

Application filed November 29, 1880. (No model.)

*To all whom it may concern:*

Be it known that I, JAMES H. ANTHONY, of the city and county of Providence, and State of Rhode Island, have invented a new and useful Improvement in Devices for Connecting and Disconnecting the Shafts and Fly-Wheels of Sewing-Machines; and I do hereby declare that the following specification, taken in connection with the accompanying drawings, forming a part of the same, is a full, clear, and exact description thereof.

My invention relates generally to means for connecting the combined pulley and fly-wheel of a sewing-machine to the driving-shaft thereof, to produce a motion of the working parts, and for disconnecting said wheel and shaft that said parts may be motionless during the operation of winding a bobbin. It relates specifically to an improvement in a known device for this purpose, composed of the following elements: a cylindrical shaft having a conical bearing, a combined pulley and fly-wheel whose hub is fitted to said bearings and whose exterior is threaded, and a hand-nut which engages the threaded hub and forces the conical bearings on the shaft and hub into firm contact, thereby rotatively connecting the wheel and shaft.

My improvement consists in constructing that end of the wheel-hub which is provided with a conical bearing so that it will yield and thereby promptly become disengaged from the conical bearing on the shaft when the clamping or hand nut is turned back. This I accomplish by dividing said end of the hub by two or more radial slots, as will hereinafter appear.

In the use of the device described without my improvement—that is, without a divided hub—the conical bearings on the shaft and hub are quite likely to bind after the nut has been turned back, unless the said conical bearings are very accurately fitted to each other, and even then the wheel does not become as promptly disengaged from rotative connection with the shaft as is desirable. When the said hub is constructed so as to yield, however, a prompt disengagement follows the turning back of the nut.

Figure 1:
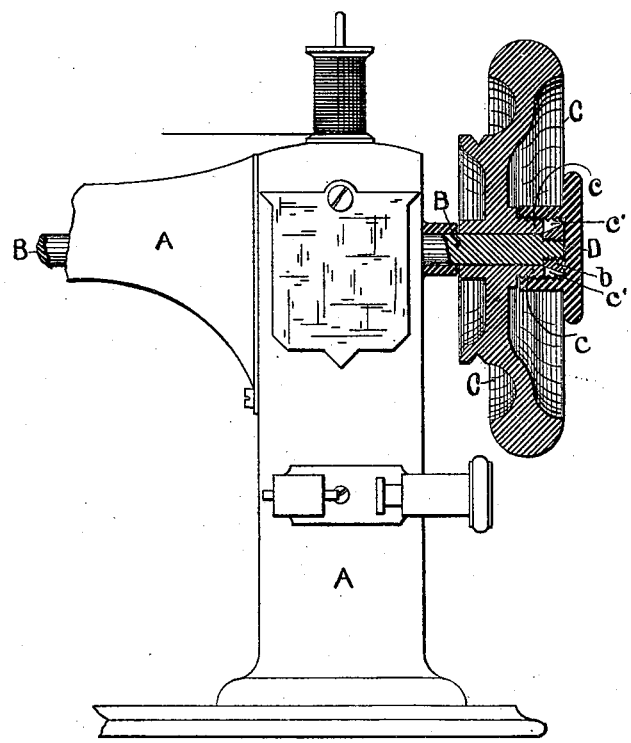
Figure 2:
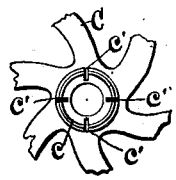

Referring to the drawings, Figure 1 represents a portion of a sewing-machine with the shaft, wheel, and hand-nut in section; and Fig. 2 shows an end view of the divided hub.

A denotes a portion of the frame of the machine. B is the cylindrical shaft, having a conical bearing, $b$, upon its end. C is the combined pulley and fly-wheel, which is loosely mounted on the shaft and has the bearing portions of its hub $c$ fitted to the cylindrical and conical portions of the shaft. The periphery of the outer portion of the hub is threaded, and engaged by a hand-nut, D, which effects the rotative connection of the shaft and wheel, and also their disengagement in a well-known manner.

As shown in both figures of the drawings, the outer end of the hub $c$ is divided by radial slots $c'$, which may be two or more in number.

When the nut D is turned sufficiently to clamp the wheel to the shaft, the said parts are firmly combined, and when the nut is turned back the parts become promptly disengaged, owing to the yielding character of the hub.

Having described my invention, what I claim, and desire to secure by Letters Patent, is—

The combination, with a driving-shaft having cylindrical and conical bearings, of a combined pulley and fly-wheel having a threaded hub which is divided by radial slots and fitted to said bearings, and a hand-nut which engages said threaded hub, whereby the shaft and wheel may be readily connected and disconnected, substantially as set forth.

JAMES H. ANTHONY.

Witnesses:
GEORGE FULLER,
I. KNIGHT.